July 9, 1968  J. R. BARBER ET AL  3,391,808
FERTILIZER STORAGE AND DELIVERY APPARATUS
Filed April 18, 1966  5 Sheets-Sheet 2
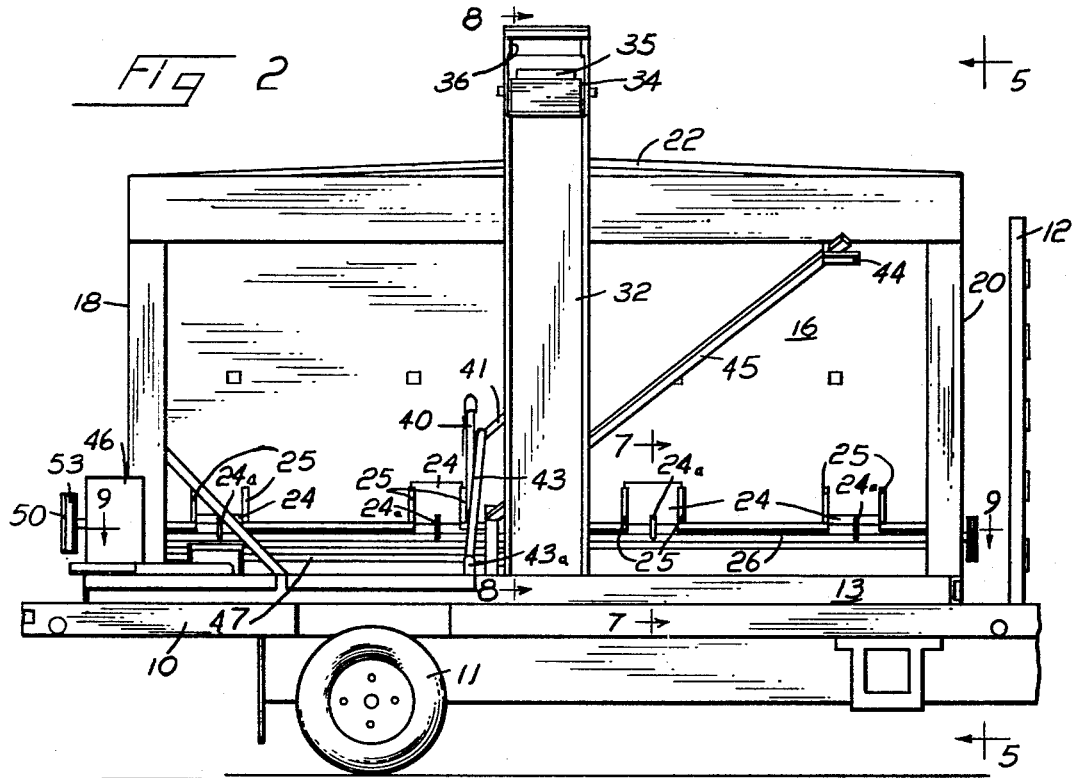
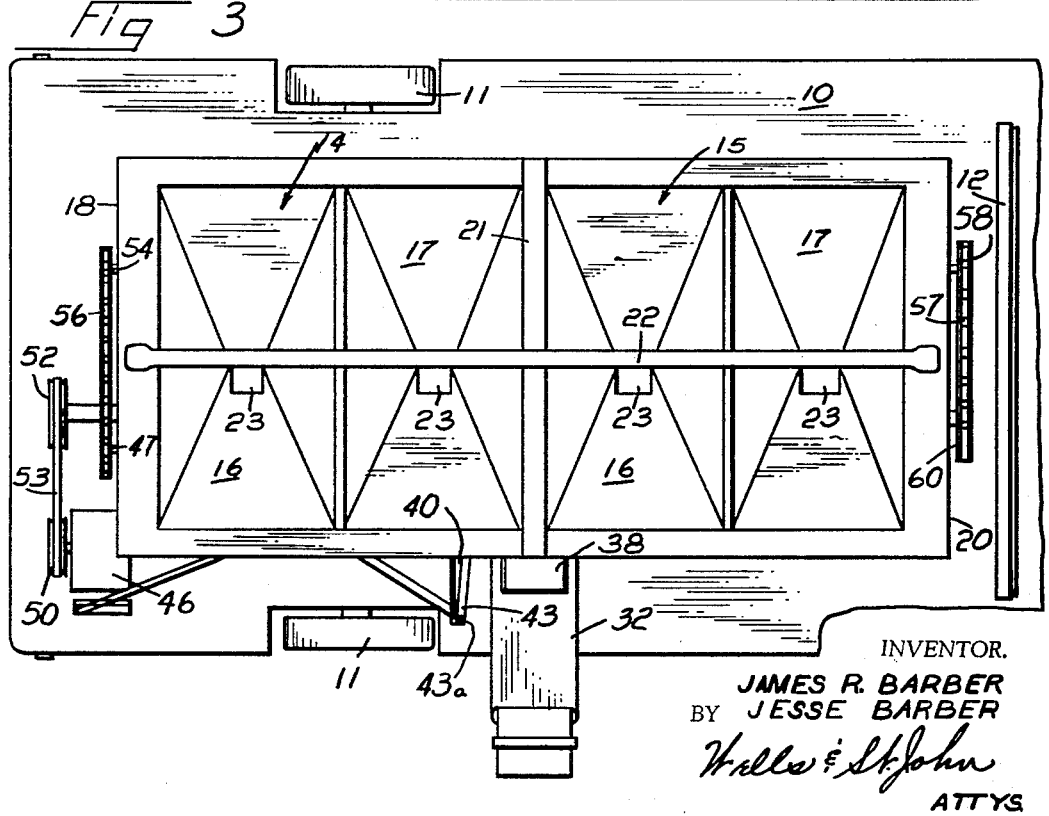
INVENTOR.
JAMES R. BARBER
BY JESSE BARBER
ATTYS.

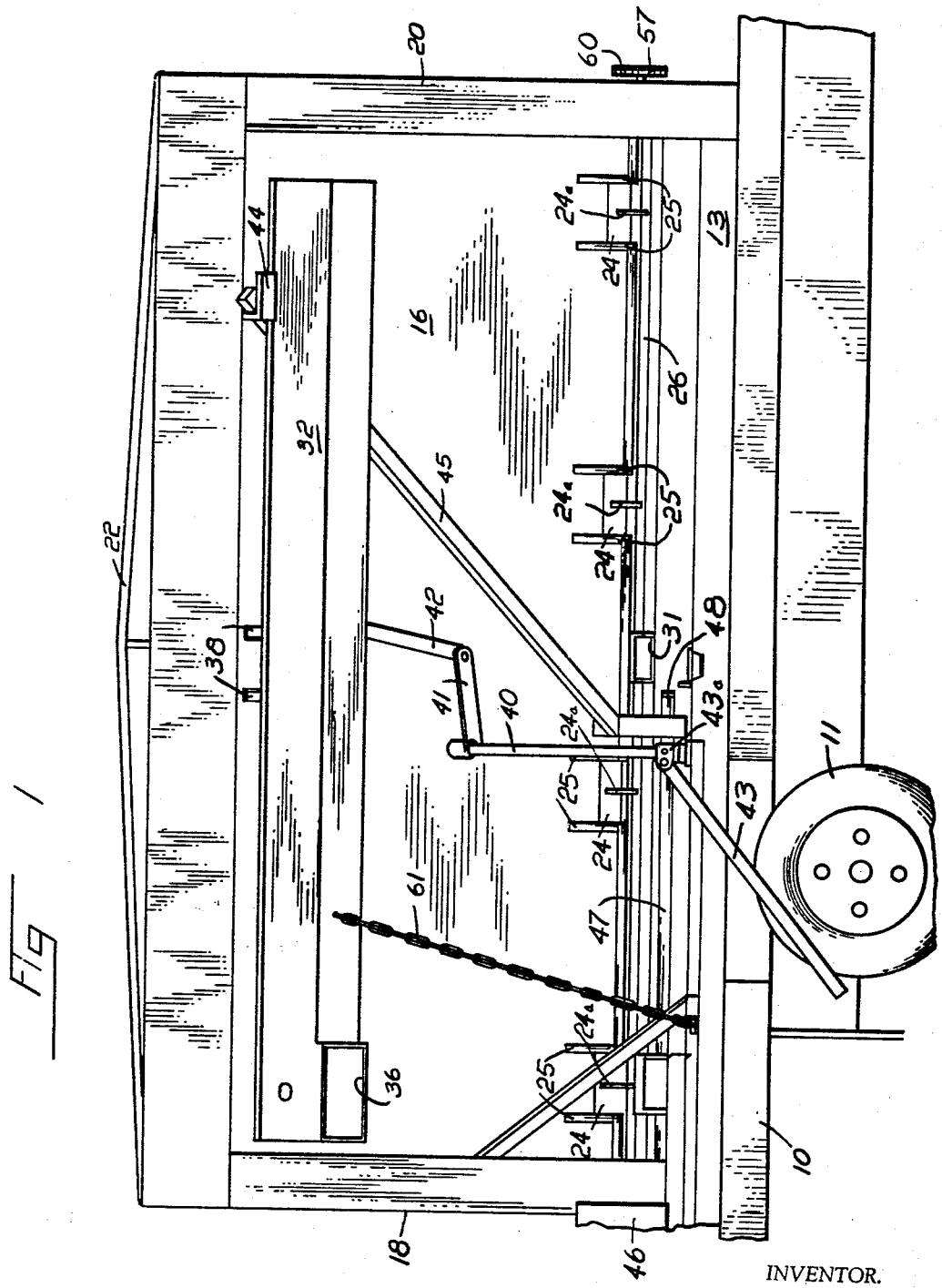
INVENTOR.
JAMES R. BARBER
BY JESSE BARBER
ATTYS.

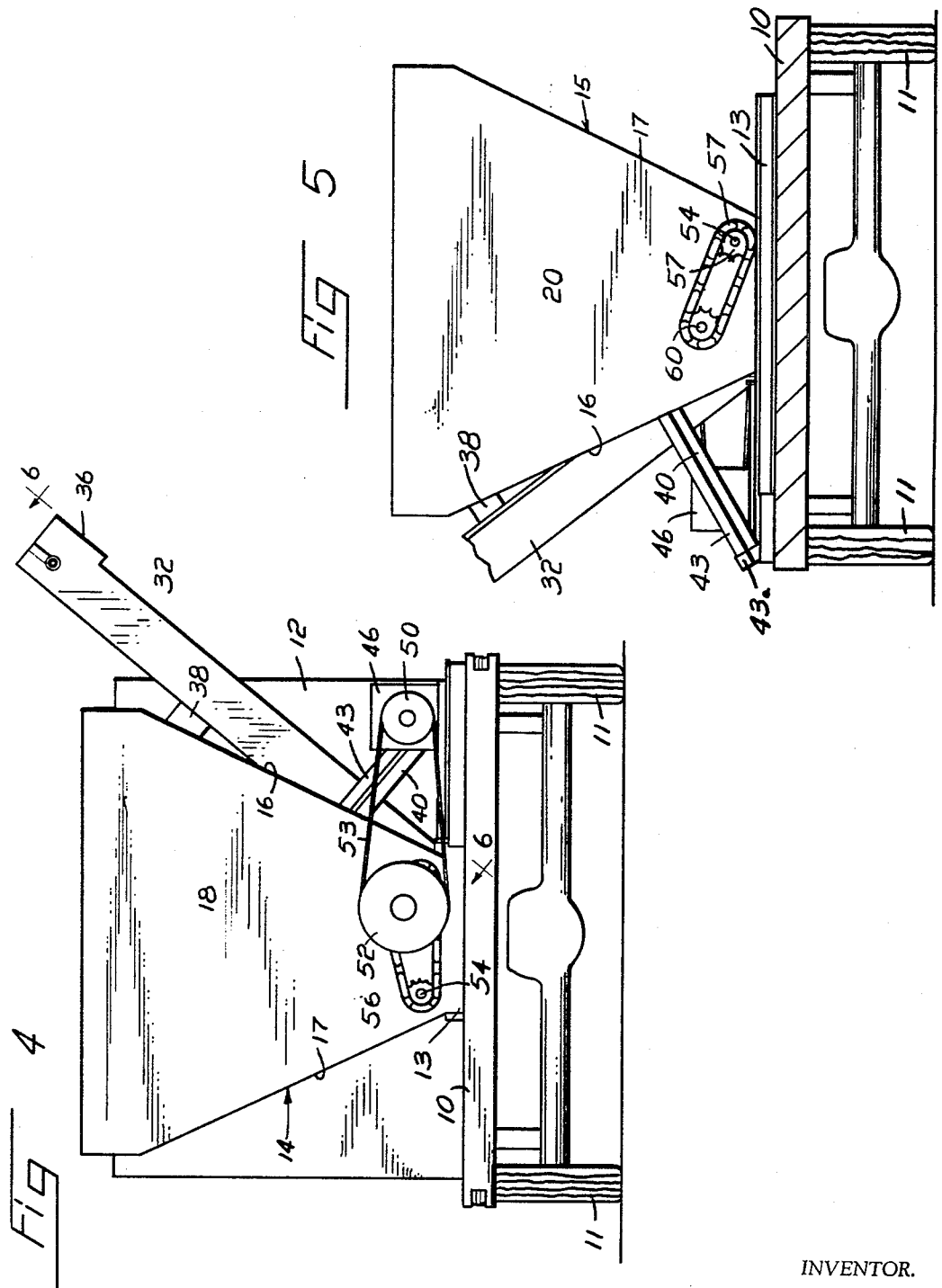

July 9, 1968 J. R. BARBER ET AL 3,391,808
FERTILIZER STORAGE AND DELIVERY APPARATUS
Filed April 18, 1966 5 Sheets-Sheet 4
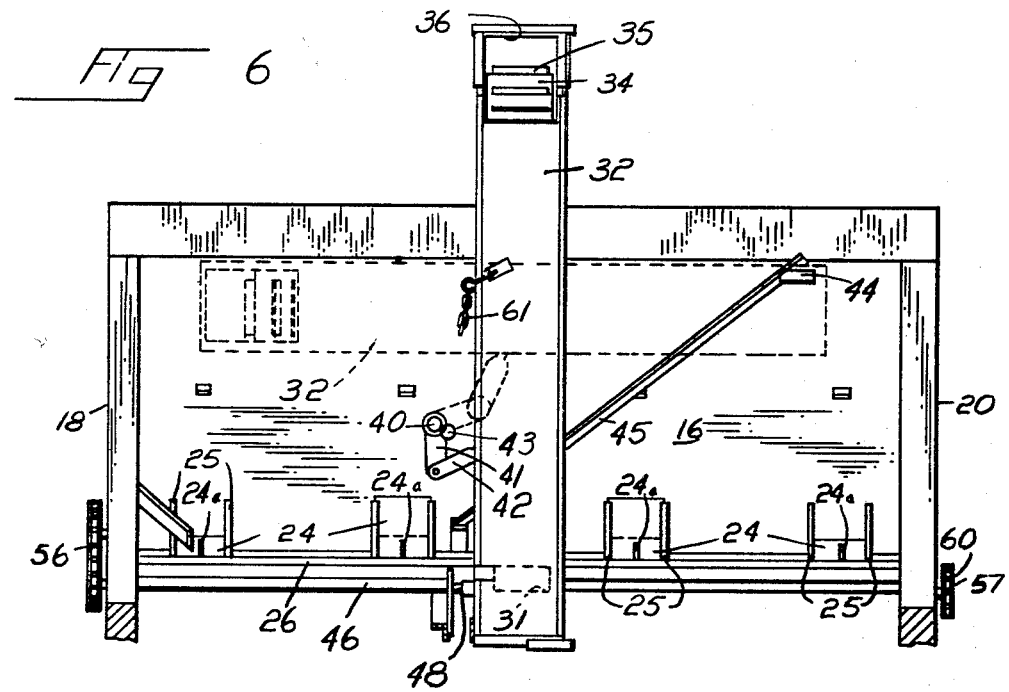
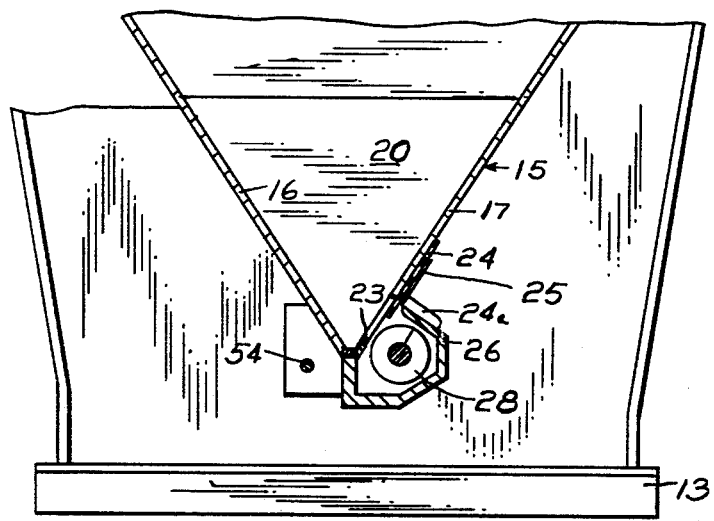
INVENTOR.
JAMES R. BARBER
BY JESSE BARBER
ATTYS.

July 9, 1968    J. R. BARBER ET AL    3,391,808
FERTILIZER STORAGE AND DELIVERY APPARATUS
Filed April 18, 1966    5 Sheets-Sheet 5
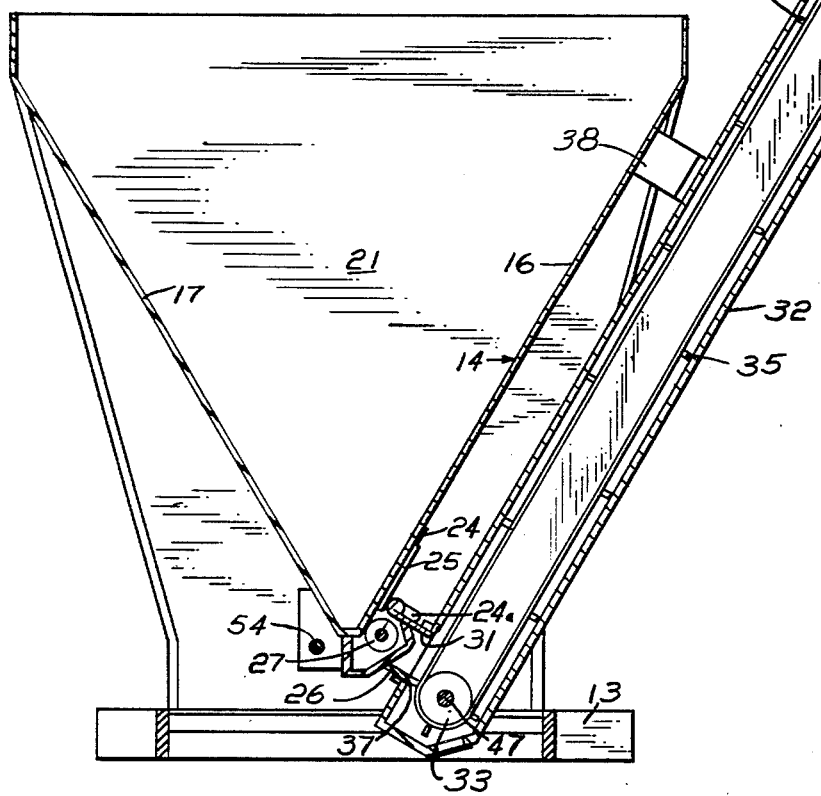
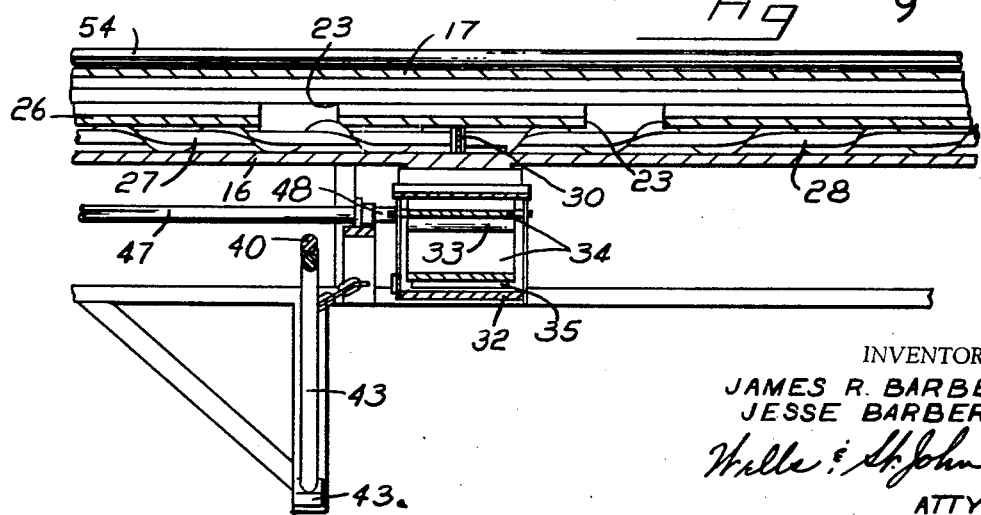
INVENTOR.
JAMES R. BARBER
JESSE BARBER
ATTYS

United States Patent Office 3,391,808
Patented July 9, 1968

3,391,808
FERTILIZER STORAGE AND DELIVERY APPARATUS
James R. Barber and Jesse Barber, both of 1404 Regal St., Spokane, Wash. 99202
Filed Apr. 18, 1966, Ser. No. 543,299
5 Claims. (Cl. 214—17)

ABSTRACT OF THE DISCLOSURE

A storage and delivery apparatus mounted on a truck, including a hopper with two divided compartments. Each hopper compartment has lower openings in communication with a receiving auger mechanism. A material delivery conveyor is mounted on the hopper side wall about an axis perpendicular to it and a crank mechanism is connected to it for movement between a storage position and an operative position. Separate auger mechanisms are provided for mixing the material from the two hopper sections.

---

This invention relates to a fertilizer storage and delivery apparatus of the type designed to be carried on a mobile truck for use in servicing field fertilizer spreaders.

The apparatus described below is conventionally known as a "nurse box," being used to carry fertilizer or other granular materials to machines or devices which then distribute or use the materials in the field. The apparatus is designed specifically for use in fertilizer operations. It comprises storage hoppers and a foldable conveyor apparatus designed to facilitate the delivery of fertilizer from the hoppers to a spreader or other device which ultimately processes the material.

The first object of this invention is to provide a completely self-contained storage and delivery system which can be placed as a unit on a flat bed truck without requiring any modification of the truck structure. This is accomplished so as to permit this apparatus to be placed upon a truck or removed at will, the apparatus requiring no complicated or expensive vehicular structure of its own. The portability of the apparatus makes it particularly useful for farm applications, since it does not require modification of a truck and existing equipment can be used to carry the structure as required.

Another object of this invention is to provide a rather simple conveyor structure that is movable relative to the storage hopper so as to be folded to a compact horizontal position for travel, the conveyor being readily available for delivery purposes in discharging fertilizer from the hopper on which it is carried. Another object of this invention is to provide a basic hopper structure and delivery apparatus which is capable of mixing granular materials during delivery, and the structure being capable of accurately providing a proportioned mix of materials from more than one hopper.

Another object of the invention is to provide a simple drive mechanism for the hopper discharge and delivery conveyor systems, the moving parts being timed relative to one another and the entire apparatus being driven by a single source of power.

These and further objects will be evident from the following disclosure, taken together with the accompanying drawings used to illustrate a preferred form of the invention. It is to be understood that this form of the invention is only presented as an example and that modifications will be observable to those skilled in this art.

In the drawings:

FIGURE 1 is a side elevation view of the apparatus mounted along the rear end of a truck;

FIGURE 2 is a view similar to FIGURE 1, showing the apparatus at a reduced scale with the conveyor raised to its discharge position;

FIGURE 3 is a top view of the apparatus as illustrated in FIGURE 2;

FIGURE 4 is a rear end view of the apparatus as shown in FIGURE 2;

FIGURE 5 is a front end view of the apparatus as seen along line 5—5 in FIGURE 2, the upper end of the conveyor being broken away;

FIGURE 6 is a view taken along line 6—6 in FIGURE 4, the storage position of the conveyor being illustrated in dashed lines;

FIGURE 7 is an enlarged fragmentary sectional view taken along line 7—7 in FIGURE 2;

FIGURE 8 is an enlarged sectional view taken along line 8—8 in FIGURE 2; and

FIGURE 9 is an enlarged fragmentary sectional view through the center portion of the machine as seen along line 9—9 in FIGURE 2.

The apparatus described below is designed for the storage, transportation and mixing of fertilizer or other granular materials. When used in a fertilizer operation, the apparatus provides bulk storage that is portable so that the bulk storage facility can be used in the field. It also includes a powered conveyor to elevate the granular material and discharge it into another receptacle, such as the hopper of a field fertilizer spreader.

The apparatus is shown in the drawings mounted on a truck bed 10. The truck bed 10 is supported by rear truck wheels 11. At the front of the bed 10 is an upright wall 12 placed rearward of the truck cab (not shown). It is to be understood that any suitable truck bed 10, trailer or other vehicular structure can be substituted in place of the structure illustrated.

The apparatus mounted on the truck bed 10 rests upon a horizontal base frame 13. Extending upwardly from the base frame 13 is a hopper structure including rear hoppers 14 and front hoppers 15. The hopper 14, 15 are substantially identical, each hopper including two chambers. It is to be understood that the hoppers 14 can be of any desired configuration and may have only a single chamber or additional multiple chambers as might be required.

The hoppers are defined by side walls 16, 17 which converge downwardly to an apex located slightly above the base frame 13. The external configuration of the hopper construction further comprises a vertical rear wall 18 and a vertical front wall 20. Between hoppers 14 and 15 is an upright wall section 21, which terminates at the side walls 16, 17. The upper edges of the hoppers 14, 15 are reinforced and the walls 18, 20 are structurally interconnected by an upper longitudinal truss 22.

Each hopper 14, 15 is provided with two hopper openings 23 (FIGURE 3). The openings 23 are rectangular and are formed along the side wall 16 immediately adjacent the lower edge thereof. The openings 23 provide a discharge opening at the lower end of each hopper compartment.

The respective rectangular openings 23 are selectively covered by slidable rectangular doors 24 having outwardly projecting handles 24a. The doors 24 slide between fixed guides 25 on the outer surface of the wall 16. The position of each handle 24a is such that it supports the door 24 in either a closed or open position by abutting the longitudinal auger housing 26 described below. The doors 24 are shifted between open and closed positions by sliding each door 24 relative to the guide 25 and reversing its positions so that handle 24a will either abut auger housing 26 to hold the door 24 in an upper position or will permit the door 24 to slide downwardly and completely close the opening 23 adjacent to it.

Extending along the front and rear hoppers 14, 15 at the lower edge of wall 16 is a longitudinal auger housing 26, which cooperates with wall 16 to form a longitudinal enclosure. The auger housing 26 overlaps the auger openings 23 and is suitably recessed to permit the respective doors 24 to cover the hopper openings 23 as previously described. When a door 24 is in its raised position, the hopper which it controls will be in open communication with the interior of auger housing 26.

Supported within the auger housing 26 is a rear longitudinal auger 27 and a coaxial front longitudinal auger 28. The respective augers 27, 28 are rotatably journalled by suitable bearings carried by the walls 18, 20 respectively and a center bearing 30 (FIGURE 9) carried within the auger housing 26. The augers 27, 28 have spiral blades mounted thereon, enabling them to move material within the auger housing 26 to the center portion thereof.

At its center the auger housing 26 is provided with an outwardly protruding rectangular discharge opening 31 (FIGURE 1). Material delivered into the auger housing 26 is discharged through the opening 31. It is fed into a conveyor mechanism described below which elevates the material and discharges it to a waiting receptacle.

The conveyor assembly is mounted in a conveyor housing 32 enclosed along its length. The housing 32 supports the conveyor mechanism (FIGURE 8) which generally consists of a conventional set of pulleys 33 and an endless belt 34 having suitable outwardly projecting paddles 35. The upper end of conveyor housing 32 is provided with an outwardly directed discharge opening 36. The lower end of the conveyor housing 32 is provided with an inwardly directed inlet opening 37 bounded on three sides by rectangular plates positioned complementary to the sides of the rectangular discharge opening 31 of auger housing 26.

The conveyor housing 32 is pivotally supported on wall 16 by a protruding bracket 38 which carries the housing 32 about an axis perpendicular to wall 16. This pivotal connection of the conveyor housing 32 permits housing 32 to be moved between the vertical discharge position shown in FIGURES 4, 6 and 8 and the horizontal storage position extending along the upper edge of the hoppers 14, 15, illustrated in FIGURE 1 and shown in dashed lines in FIGURE 6. The conveyor housing 32 is movable between these two positions and is controlled by a crank assembly best understood from FIGURES 1 and 6. The crank assembly includes a pivoted crank shaft 40 suitably journalled on wall 16 and base frame 13.

A crank arm 41 is fixed to the inner end of shaft 40 and protrudes radially outward from the shaft axis to a parallel pivotal connection with a connecting link 42. Link 42 is pivoted about parallel axes at one end to arm 41 and at its remaining end to the conveyor 32.

Pivotal movement of shaft 40 will therefore be transmitted through arm 41 and link 42 to swing the conveyor housing 32 about its pivotal axis on wall 16 between the upright discharge position shown in full lines in FIGURE 6 and the horizontal storage position shown in dashed lines. Pivotal movement is preferably transmitted to shaft 40 by means of an outer handle 43 which is attached to shaft 40 by a bracket 43a. The bracket 43a permits handle 43 to be folded back on the shaft 40 so as to not obstruct the area adjacent to the conveyor housing 32. The bracket 42a does not permit the handle 43 to pivot shaft 40 about its axis relative to wall 16.

To define the limit of pivotal movement of the conveyor housing 32 relative to wall 16 there is provided an outwardly protruding bracket 44 in the path of movement of the lower end of a conveyor housing 32. Bracket 44 is mounted at the upper end of a diagonal brace 45 extending upwardly from base frame 13 to wall 16.

Power is supplied to auger 27 from an engine 46 or other suitable source of power. The engine 46 drives auger 27 through a motor pulley 50, a pulley 52 fixed to the shaft of auger 27 and connecting power belt 53. A conveyor drive shaft 47 is provided with a suitable coupling (FIGURE 6) adapted to engage the lower conveyor shaft within the movable conveyor housing 32. It is coupled to auger 27 by a drive chain 56. There is, therefore, a direct connection between shaft 47 and the lower conveyor pulley 33 when the housing 32 is in its upright position. The coupling 48 automatically disconnects when tion. Shaft 47 is positoned on base frame 13 for proper alignment with the lower shaft of the conveyor.

The front auger 28 is driven by means of chain 56, which is enmeshed about a sprocket on auger 27. Chain 56 is wrapped about a sprocket on a power transfer shaft 54 rotatably mounted adjacent the lower edge of side wall 17. The front end of shaft 54 is provided with a sprocket 58 which powers a sprocket 60 at the front end of the shaft for auger 28, sprockets 58 and 60 being drivingly engaged by a connecting front chain 57 (FIGURE 5).

The apparatus is used for storage and transfer of materials, the supporting truck being capable of highway or field use. The hoppers 14 and 15 can be used to store identical material or two different types of granular material which are to be discharged separately or as a mixture. If only one material is to be discharged, only the door 24 leading to that material would be opened. If both types of material are to be discharged, two doors 24 would be open as shown in FIGURE 6. By selecting the proper sprocket sizes for sprockets 58 and 60, the relative speed of rotation between augers 27 and 28 can be controlled to provide the desired proportional mix of the two materials as they are received into the conveyor housing 32 through discharge opening 31 in the auger housing 26.

The conveyor housing 32 is stored in its horizontal position for highway purposes, preferably anchored by a chain 61 (FIGURE 1) or other suitable locking device to hold the front end of the conveyor housing 32 against the upper bracket 44. When discharge of material is desired, chain 61 is released and handle 43 is swung in a clockwise direction as seen in FIGURES 1 and 6 to pivot the conveyor housing 32 to a vertical position. As the lower end of the housing 32 reaches its vertical position, the three sided inlet opening 37 will fit about the sides of the discharge opening 31 of the auger housing 26 in an overlapping fashion so as to provide a substantially sealed connection between housing 26 and housing 32. The shaft 47 will be automatically coupled to the shaft for the lower pulley 33 within conveyor housing 32 due to the engagement of coupling 48. Operation of engine 46 will power both the conveyor belt 34 and the augers 27 and 28. The choice of material to be fed into auger housing 28 is controlled by suitable operation of the doors 24.

The illustrated structure, while exemplary of the apparatus contemplated, could be modified in certain details without deviating from the basic purposes and concepts of the invention. For this reason, the invention is not to be limited except as defined in the following claims.

Having thus described my invention, I claim:

1. A storage and delivery apparatus, comprising:

a bulk storage hopper having an inwardly and downwardly sloping side wall section;

a hopper discharge opening adjacent the lower edge of said side wall section in selective open communication with the interior of said hopper;

conveying means pivotally mounted on the side wall section of said bulk storage hopper about an axis perpendicular thereto, said conveying means being selectively movable between an upright position and a substantially horizontal storage position;

and material delivery means on said storage hopper side wall section in communication with said discharge opening to deliver material from the interior of said hopper to the lower end of said conveying means when said conveying means is positioned in its upright operative position;

a crank shaft pivotally mounted on the side wall section of said hopper adjacent to said conveying means at a location clear of the pivotal path of said conveying means between its operative and storage positions, said crank shaft being pivotally mounted about an axis parallel to the axis of said conveying means on said hopper side wall sections;

a crank arm projecting radially outward from said crank shaft adjacent to the side wall section of said hopper;

and a connecting link pivotally mounted at its respective ends to the outer end of said crank arm and to said conveying means about axes parallel to the axes of said crank shaft and conveying means relative to said hopper.

2. An apparatus as set out in claim 1, further, comprising:

an operating arm at the outer end of said crank shaft connected to said crank shaft by a bracket permitting the operating arm to be folded back along the crank shaft.

3. A storage and delivery apparatus, comprising:

a bulk storage hopper having an inwardly and downwardly sloping side wall section;

a hopper discharge opening adjacent the lower edge of said side wall section in selective open communication with the interior of said hopper;

conveying means pivotally mounted on the side wall section of said bulk storage hopper about an axis perpendicular thereto, said conveying means being selectively movable between an upright position and a substantially horizontal storage position;

and material delivery means on said storage hopper side wall section in communication with said discharge opening to deliver material from the interior of said hopper to the lower end of said conveying means when said conveying means is positioned in its upright operative position;

said hopper being divided into two separate compartments spaced in longitudinally adjacent locations and defined by a common downwardly sloping side wall section;

each compartment of said hopper being provided with a discharge opening adjacent to the lower end of the common side wall section;

said material delivery means comprising a common auger housing fixed to the lower end of said side wall section in selective open communication with the hopper discharge openings;

and separate auger mechanisms within said auger housing to direct material to a common outer discharge opening through said auger housing in selective communication with the lower end of said conveying means when said conveying means is in its upright position.

4. An apparatus as set out in claim 3, further comprising:

drive means operatively connected to each of the auger conveyor devices;

said drive means is in its upright operative position.

5. In combination with a bulk storage hopper having an inwardly sloping side wall section and a hopper discharge opening adjacent the lower end of the sloping side wall section;

and a conveyor pivotally mounted on said side wall section about an axis perpendicular thereto above said opening;

said conveyor having a receiving member thereon complementary to the hopper discharge opening positioned so as to be in sealed communication with the hopper discharge opening when said conveyor is in an upright position relative to the hopper;

a crank shaft pivotally mounted on the hopper side wall about an axis parallel to the pivotal axis of said conveyor realtive to the wall section;

a crank arm fixed to said crank shaft and projecting radially outward therefrom;

and a rigid link pivotally connected at one end to the outer end of said crank arm and its remaining end to said conveyor at a positon radially located outward from the axis of the conveyor on the side wall section, the pivotal axes of said link being parallel to the axis of said crank shaft and conveyor relative to the hopper side wall section;

and means connected to said crank shaft adapted to permit said crank shaft to be pivotally moved relative to the hopper side wall section.

References Cited
UNITED STATES PATENTS

| | | | |
|---|---|---|---|
| 2,381,780 | 8/1945 | Simons | 214—83.26 |
| 3,179,273 | 4/1965 | Barber et al. | 214—83.26 X |

ROBERT G. SHERIDAN, *Primary Examiner.*